United States Patent [19]

Schmolka

[11] Patent Number: 4,473,492
[45] Date of Patent: Sep. 25, 1984

[54] ELECTRODE CREAM

[75] Inventor: Irving R. Schmolka, Grosse Ile, Mich.

[73] Assignee: BASF Wyandotte Corporation, Wyandotte, Mich.

[21] Appl. No.: 501,534

[22] Filed: Jun. 6, 1983

[51] Int. Cl.$^3$ .............................................. H01B 1/06
[52] U.S. Cl. ..................................... 252/518; 252/351; 252/DIG. 14; 252/500; 128/803
[58] Field of Search ....... 252/500, 518, 351, DIG. 14, 252/316, 317; 128/639, 640, 644; 424/341; 524/401

[56] References Cited

U.S. PATENT DOCUMENTS

| 3,048,549 | 8/1972 | Adams | 252/518 |
| 3,665,064 | 5/1972 | Mosier et al. | 252/514 |
| 3,976,055 | 8/1976 | Monter et al. | 252/511 |
| 4,299,231 | 11/1981 | Karmann et al. | 252/500 |
| 4,326,977 | 4/1982 | Schmmolka | 252/351 |
| 4,364,929 | 12/1982 | Sasmoi et al. | 252/518 |

Primary Examiner—Josephine L. Barr
Attorney, Agent, or Firm—Bernhard R. Swick

[57] ABSTRACT

This invention relates to a stable electrode cream capable of carrying weak electric current comprising an electrolyte in normal electrolyte amounts, a polyoxyethylene-polyoxybutylene block copolymer wherein the polyoxybutylene portion of the compound has a molecular weight of at least about 1000, and the polyoxyethylene portions contribute from about 60 to 90 percent by weight of the compound, the amount of the block copolymer being about 10 to 30 percent by weight and the balance substantially water.

11 Claims, No Drawings

ELECTRODE CREAM

BACKGROUND OF THE INVENTION

1. Field of the Invention

This invention relates to electrode creams capable of carrying weak electric currents and suitable for use on humans for purposes such as with electrocardiographic diagnostic equipment.

2. Description of the Prior Art

The use of electrical equipment for diagnosing human physical conditions or for use in preventive medicine has been employed by the medical profession for many years. One particular example of this is electrocardiographic diagnostic equipment. For such purposes it is necessary to be able to reliably transmit an electric current from the body of the patient to the recording equipment. To accomplish this, an electrically conductive material must be provided in order to contact the skin with the electrodes of the equipment and form a good electrical contact. In the prior art, generally, a cream is provided containing an electrolyte in order to transmit the electrical current from the body of a patient to the electrode and ultimately to the recording equipment. In general, in the prior art electrolytes such as inorganic salts, for example, sodium chloride, have been employed mixed with creams to accomplish this purpose. However, such electrolytes, i.e., halide salts, are generally irritating to the human skin and in some cases may be toxic. Accordingly, it is often necessary to remove the residue from the patient's skin immediately upon completion of conductive tests. High inorganic salt content plus other chemicals necessarily incorporated in these creams or gels can have an irritating effect on the sensitive skin. Such prior art creams often cause a rash or a burning irritation. In the past, additives have been provided to reduce these problems. However, many of the nontoxic systems which have been prepared are often found to lack the property of keeping the electrolyte in solution or in suspension over a wide temperature range.

SUMMARY OF THE INVENTION

The instant invention, relates to an electrode cream comprising a polyoxyethylene-polyoxybutylene block copolymer, an electrolyte and water which may also contain other conventional additives. This cream is substantially free from irritation, such as burning-type irritation, is generally nontoxic and stable, that is to say, the electrolyte remains in solution or suspension over a wide temperature range. The copolymer contains about 60 to 90 percent oxyethylene groups, and the molecular weight, of the polyoxybutylene groups, is at least about 1000.

DESCRIPTION OF THE PREFERRED EMBODIMENTS

The cream of this invention preferably comprises at least about 1 percent by weight electrolyte, 10 to 30 percent of the polyoxyethylene-polyoxybutylene copolymer, 0 to about 10 percent of other additives, balance water. In general, almost any amount of the electrolyte may be employed in excess of 1 percent. However, the economic maximum is about 10 percent.

The nonionic surfactant of use in the invention is a cogeneric mixture of conjugated polyoxybutylene polyoxyethylene compounds having as a hydrophobe a polyoxybutylene polymer of at least 1000 molecular weight. The polyoxybutylene compounds are prepared by first condensing butylene oxide with an organic compound containing a plurality of reactive hydrogen atoms to prepare a polyoxybutylene polymer of atleast 1000 molecular weight, and subsequently condensing ethylene oxide therewith. The compounds used in this invention conform to the following generic formula:

$$Y[(C_4H_8O)_n\text{—}E\text{—}H]_x \qquad (A)$$

wherein Y is the residue of a water soluble organic compound containing therein x active hydrogen atoms; n is an integer; x is an integer, the values of n and x are such that the molecular weight of the compound, exclusive of E, is at least 1000, as determined by hydroxyl number, E is a polyoxyalkylene chain wherein the oxygen/carbon atom ratio is at least 0.5, and E constitutes about 60 to 90 percent by weight of the compound.

The polyoxybutylene polymer, which is an intermediate in the preparation of the compounds of use in this invention, has the following structure:

$$Y[(C_4H_8O)_nH]_x \qquad (B)$$

wherein Y, n and x are defined as in Formula A above.

The preferred compounds of use in this invention are prepared by condensing ethylene oxide in an amount between 60 and 90 percent by weight of the resultant compound, with the polyoxybutylene polymer. These compounds have the following formula:

$$Y[(C_4H_8O)_n(C_2H_4O)_mH]_x \qquad (C)$$

wherein Y, n and x are defined as in Formula A and m has a value such that the oxyethylene groups constitute 60 to 90 percent by weight of the compound.

The hydrophilic portion of the polyoxyalkylene compounds may be supplied in whole or in part by other polyoxyalkylene chains in lieu of the polyoxyethylene chain set forth in Formula C. Any polyoxyalkylene chain may be used where the oxygen/carbon ratio contained therein is at least 0.5.

Examples of initiators are water and water-soluble organic compounds containing therein x active hydrogen atoms, the residue of which is Y. These include diols such as propane diol, butanediol, triols such as glycerol and trimethylol propane, tetrols such as pentaerythritol as well as initiators containing more than four hydroxyl groups such as hexitol and sucrose. Also, amines and low molecular weight water-soluble compounds having two or more active hydrogen atoms, such as ethylene diamine, diethanolamine or diethylene triamine, may be used as the initiator. Preferably used is butanediol. More preferably used is 1,4-butanediol.

The butylene oxide used in making the hydrophobic polyoxybutylene polymer, which is an intermediate in the preparation of the compounds used in this invention, may be replaced with up to 10 percent by weight of propylene oxide or ethylene oxide when added as a mixture with the butylene oxide. Also, up to 10 percent by weight of propylene oxide or butylene oxide may be used to replace ethylene oxide, when added as a mixture with ethylene oxide, in preparing the surfactants used in this invention. In lieu of butylene oxide, other 4-carbon cyclic ethers such as methyloxyethane, tetrahydrofuran and isobutylene oxide may be used.

When ethylene oxide is condensed with a polyoxybutylene glycol of at least 1000 molecular weight and derived from a butanediol initiator, the resulting compounds have the following structure:

$$HO(C_2H_4O)_m(C_4H_8O)_n(C_2H_4O)_{m'}H \qquad (D)$$

where n is defined as previously set forth; and m'+m have a value such that the oxyethylene groups constitute 60 percent by weight to 90 percent by weight of the compound. Preferably used is a surfactant having a hydrophobe of about 2400 to 4000 molecular weight and containing about 70 to 80 percent by weight ethylene oxide. A more detailed disclosure of the preparation of the polyoxybutylene-polyoxyethylene copolymers can be found, for instance, in U.S. Pat. Nos. 2,828,345, 4,326,977, British Patent No. 722,746 and *Block and Graft Copolymerization*, vol. 2, edited by R. J. Ceresa, pages 68 and 69, John Wiley and Sons.

Various electrolytes may be incorporated in the electrode cream of this invention. The preferred electrolytes are those that are neutral in pH or slightly acidic and which are capable of carrying an electric current by virtue of their ability to ionize in an aqueous system. Almost any water-soluble ionizable salt which can conduct an electric current may be employed. These salts may be inorganic or organic. Typical examples are the nitrates, sulfates, citrates, maleates, malonates, oxalates, salicylates, acetates, phosphates, benzoates, borates, carbonates of ammonia, sodium, potassium and lithium. Salts of organic acids, such as benzoic, salicylic, tartaric, citric, lactic or malic acids may also be employed as the electrolyte. The amount of electrolyte used will generally depend upon the electrolyte itself. Those which ionize completely can be used in smaller quantities than those which ionize incompletely. Generally, an amount of about 1 to 10 percent by weight of the total composition is sufficient although considerably greater amounts than 10 percent may be employed. The maximum is determined primarily by economics. While, as stated above, the amount of the nonionic needed to form the cream is generally about 10 to 30 percent by weight of the final product, it is preferred to employ between 15 and 20 percent by weight.

Conventional electrolyte cream additives may be employed although they are not essential. Preferably they are employed in amounts up to about 10 percent by weight of the overall composition. Where employed, the minimum amount is about 0.5 percent. Such materials as bacteria and mold inhibitors, natural or synthetic gumming agents and emollients may be employed.

These comprise many materials which may be classified as follows:
1. Hydrocarbon oils and waxes. Mineral oil, petrolatum, paraffin, ceresin, ozokerite, microcrystalline wax, and polyethylene, perhydrosqualene (squalane).
2. Silicone oils. Dimethyl polysiloxanes, methylphenyl polysiloxanes, water-soluble and alcohol-soluble silicone glycol copolymers.
3. Triglyceride esters. Vegetable and animal fats and oils.
4. Acetoglyceride esters. Acetylated monoglycerides.
5. Ethoxylated glyceride. Ethoxylated glyceryl monostearate.
6. Alkyl esters. Methyl, isopropyl, and butyl esters of fatty acids; hexyl laurate, isohexyl laurate, isohexyl palmitate, decyl oleate, isodecyl oleate, hexadecyl (isocetyl) stearate, diisopropyl adipate, diisohexyl adipate, dihexadecyl adipate, diisopropyl sebacate, lauryl lactate, myristyl lactate, and cetyl lactate.
7. Alkenyl esters. Oleyl myristate, oleyl stearate, and oleyl oleate.
8. Fatty acids. Pelargonic, lauric, myristic, palmitic, stearic, isostearic, hydroxystearic, oleic, linoleic, ricinoleic, arachidic, behenic, erucic, and lanolin acids.
9. Fatty alcohols. Lauryl, myristyl, cetyl, hexadecyl (isocetyl), stearyl, isostearyl, hydroxystearyl, oleyl, ricinoleyl, behenyl, erucyl, 2-octyl dodecanol, and lanolin alcohols.
10. Fatty alcohol ethers. Ethoxylated or alkoxylated lauryl, cetyl, stearyl, isostearyl, oleyl, cholesterol, and lanolin alcohols; propoxylated cetyl, oleyl, and lanolin alcohols.
11. Ether-esters. Fatty acid esters of alkoxylated or ethoxylated fatty alcohols.
12. Other additives include humectants and emollients such as glycerine, jojoba oil, propylene glycol, sorbitol, as well as lanolin and derivatives thereof, waxes and derivatives, polyhydric alcohols, and polyether and polyester derivatives thereof.

The following examples further illustrate the various aspects of the invention. Where not otherwise specified throughout this specification and claims, temperatures are in degrees centigrade and parts, percentages and proportions are by weight. The electrode creams of the examples were prepared by adding water to a vessel equipped with a mechanical stirrer. The other ingredients are added slowly, individually or as a group and mixed until dissolved. Some heat may be employed to hasten solution. All of the nonionics are polyoxyethylene adducts of a polyoxybutylene hydrophobic base, wherein the polyoxybutylene hydrophobic base is prepared by reacting 1,2-butylene oxide with a 1,4-butylene glycol initiator.

EXAMPLE 1

An electrode gel was prepared as described above from 16 parts of a polyoxyethylene adduct of a polyoxybutylene hydrophobic base having a molecular weight of said base of about 3,000 and having an oxyethylene content of about 80 percent; 81 parts water, and 3 parts sodium chloride. The product was a smooth viscous cream at room temperature or below and liquified at 53° C.

EXAMPLE 2

An electrode cream composition was prepared as described above from 16 parts of the polyoxyethylene adduct of a polyoxybutylene hydrophobic base employed in Example 1; 82.4 parts water, 1.0 part of a 50 percent aqueous potassium hydroxide solution and 0.6 part citric acid. The product was a smooth viscous cream at room temperature or below and liquified at 54° C.

EXAMPLE 3

An electrode cream composition was prepared as described above from 20 parts of a polyoxyethylene adduct of a polyoxybutylene hydrophobic base having a molecular weight of said base of about 3000, and wherein the oxyethylene content is about 70 percent of the molecule; 77 parts water, 0.6 part of 85.96 percent potassium hydroxide pellets and 2.4 parts anhydrous citric acid. The product was a smooth viscous cream at room temperature or below and liquified at a temperature of 54° C.

EXAMPLES 4

An electrode cream composition was prepared as described above from 21 parts of a polyoxyethylene adduct of a polyoxybutylene hydrophobic base having a molecular weight of said base of about 2400, and wherein the oxyethylene content is about 80 percent of the molecule; 75 parts water and 4.0 parts of 99 percent potassium chloride. The product was a smooth viscous cream at room temperature or below and liquified at a temperature of 57° C.

EXAMPLE 5

An electrode cream composition is prepared as described above from 22 parts of a polyoxyethylene adduct of a polyoxybutylene hydrophobic base having a molecular weight of said base of about 3000, and wherein the oxyethylene content is about 60 percent of the molecule; 75 parts water and 3 parts of ammonium phosphate. The product is a smooth viscous cream at room temperature or below.

EXAMPLE 6

An electrode cream composition is prepared as described above from 25 parts of a polyoxyethylene adduct of a polyoxybutylene hydrophobic base having a molecular weight of said base of about 1200, and wherein the oxyethylene content is about 80 percent of the molecule; 73 parts water and 2 parts of 99 percent potassium chloride. The product is a smooth viscous cream at room temperature or below.

EXAMPLE 7

An electrode cream composition is prepared as described above from 23 parts of a polyoxyethylene adduct of a polyoxybutylene hydrophobic base having a molecular weight of said base of about 1800, and wherein the oxyethylene content is about 70 percent of the molecule; 75 parts water and 2 parts of potassium sorbate. The product is a smooth viscous cream at room temperature or below.

EXAMPLE 8

An electrode cream is prepared as described above from 22 parts of the polyoxyethylene polyoxybutylene block copolymer of Example 1, 70 parts water, 1 part sodium citrate, 5.0 parts glycerin, 0.5 part natural or synthetic oil, 0.5 part of petrolatum and 1 part of alcohol. The product is a smooth viscous cream at room temperature or below.

All of the above compositions are stable, i.e., the electrolyte remains in solution or in suspension over a wide temperature range, is nontoxic and non-irritating to the human skin.

The embodiments of the invention in which an exclusive privilege or property is claimed are defined as follows:

1. A stable electrode cream capable of carrying weak electric current comprising an electrolyte selected from the group consisting of, salts of benzoic, salicylic, tartaric, citric, lactic and malic acids and the chlorides, nitrates, sulfates, citrates, maleates, malonates, oxalates, salicylates, acetates, sorbates, phosphates, benzoates, borates, and carbonates of ammonia, sodium, potassium and lithium and mixtures thereof in normal electrolyte amounts, a polyoxyethylene-polyoxybutylene block copolymer wherein the polyoxybutylene portion of the compound has a molecular weight of at least abut 1000, and the polyoxyethylene portions contribute from about 60 to 90 percent by weight of the compound, the amount of the block copolymer being about 10 to 30 percent by weight and the balance substantially water.

2. The composition of claim 1 wherein said electrolyte is at least about 1 percent by weight of the composition.

3. The composition of claim 3 wherein said composition includes conventional additives selected from the group consisting of bacteria and mold inhibitors, gumming agents, emollients and mixtures thereof.

4. The composition of claim 3 wherein the amount of said electrolyte is about 1 to 10 percent by weight of the composition and the amount of said additives is about 0.5 to 5 percent.

5. The composition of claim 4 wherein said electrolyte is selected from the group consisting of sodium chloride, potassium chloride, potassium citrate, ammonium phosphate and potassium sorbate and mixtures thereof.

6. The composition of claim 1 wherein said polyoxyethylene-polyoxybutylene block copolymer has the formula:

$$HO(C_2H_3O)_m(C_4H_8O)_n(C_2H_4O)_{m'}H$$

wherein n, m, and m' are integers such that the copolymer consists of 60 to 90 percent by weight polyoxyethylene groups and wherein the molecular weight of the polyoxybutylene groups is about 1000 to 4000.

7. The composition of claim 6 wherein said electrolyte is at least about 1 percent by weight of the composition.

8. The composition of claim 7 wherein said electrolyte is selected from the group consisting of salts of benzoic, salicylic, tartaric, citric, lactic and malic acids and the chlorides, nitrates, sulfates, citrates, maleates, malonates, oxalates, salicylates, acetates, sorbates, phosphates, benzoates, borates, and carbonates of ammonia, sodium, potassium and lithium and mixtures thereof.

9. The composition of claim 8 wherein said composition includes conventional additives selected from the group consisting of bacteria and mold inhibitors, gumming agents, emollients and mixtures thereof.

10. The composition of claim 9 wherein the amount of said electrolyte is about 1 to 10 percent by weight of the composition and the amount of said additives is about 0.5 to 5 percent by weight.

11. The composition of claim 10 wherein said electrolyte is selected from the group consisting of sodium chloride, potassium chloride, potassium citrate, ammonium phosphate and potassium sorbate and mixtures thereof.

* * * * *